(12) United States Patent
Tichenor (10) Patent No.: US 6,421,780 B2
(45) Date of Patent: Jul. 16, 2002

(54) SYSTEM FOR CREATING HIGH AND LOW SPEED NON-ALGORITHMIC RANDOM NUMBERS FOR ENCRYPTION/ DECRYPTION

(76) Inventor: Clyde L. Tichenor, 6470 La Cumbre Rd., Somis, CA (US) 93066

( * ) Notice: Subject to any disclaimer, the term of this patent is extended or adjusted under 35 U.S.C. 154(b) by 0 days.

(21) Appl. No.: 09/930,783

(22) Filed: Aug. 14, 2001

Related U.S. Application Data

(60) Provisional application No. 60/224,778, filed on Aug. 14, 2000.

(51) Int. Cl.[7] ................................................. G06F 1/24
(52) U.S. Cl. ..................... 713/200; 713/194; 713/182; 713/189; 380/268
(58) Field of Search ................................ 713/182, 189, 713/200, 201; 380/268

Primary Examiner—Thomas R. Peeso
(74) Attorney, Agent, or Firm—Albert O. Cota (57) ABSTRACT

A method and structure for generating and publishing random number fields for both low speed and high-speed encryption. The numbers which, are derived from natural non-algorithmic sources, allow the usage of high-speed encryption devices including voice activated devices. Combining the high-speed natural non-algorithmic number fields within a computer allows the formation of a computerized encryption and decryption device which operates in combination with a non-algorithmic low-speed and high-speed natural number-generator. The computer may periodically select non-algorithmic natural random numbers from the natural random n umber-generator and may utilize a prepared software program to insert the numbers into an algorithmic expansion program. The program converts less rapidly derived non-algorithmic natural random numbers to a high-speed series of natural numbers for Internet presentation and use.

12 Claims, 7 Drawing Sheets

FIGURE 1

RANDOM NUMBERS

|  | I | 050400-22 | II |
|---|---|---|---|
| A | 5959648735631504328784533-4 | | 06277105157851694254054 7 |
| B | 2540973154468267233876467-0 | | 7538478269283457130715 32 |
| C | 1092469511879328054858286-3 | | 72149369810593051752873 0 |
| D | 5356532159523784502356904-2 | | 3945427337127265306459 72 |
| E | 7590824679135579866051364-6 | | 98984765106268499516049 2 |
| F | 3530532985987430768619265-9 | | 9874013249876161870961 31 |
| G | 2875321906989847650268499-8 | | 509768762661896234510962 |
| H | 3029847651360684979135579-8 | | 6625133065878132453585 63 |
| I | 3662824679035079866251364-8 | | 5394628073506516423547 36 |
| J | 9430532985987438068619265-9 | | 9874013249876161870961 74 |
| K | 8919821980989847051268499-5 | | 169202513646989847654929 |
| L | 7709847651360684979135579-8 | | 6625133105878132453580 55 |
| M | 6204824609135579066251364-6 | | 989807651362684995169226 |
| N | 3836532085987438768619265-9 | | 9874613249876161874967 83 |
| O | 4210821986989847651068499-5 | | 169262513606989840654921 |
| P | 6989847651362684979135509-9 | | 9874603249876161874961 85 |
| Q | 4862824679135579866251064-6 | | 98984065106268499516039 9 |
| R | 3806532985987438768609265-9 | | 98740132498761618709615 8 |
| S | 6989847651302684995169226-5 | | 169202513646989047654953 |
| T | 9479807651362684970135579-8 | | 6625133065878132453586 31 |

FIGURE 2

RANDOM NUMBERS

|   | I | II |
|---|---|---|
| A | 59596 48735 63150 43287 84533-40627 | 71051 57851 69425 4 0547 |
| B | 25409 73154 46826 72338 76407-07538 | 47826 2834 57130 7 1532 |
| C | 10924 69511 87932 80548 58280-37214 | 93698 10593 05175 2 8730 |
| D | 53565 32159 52378 45023 56904-23945 | 42733 71272 65306 4 5972 |
| E | 75908 24679 13557 98660 51364-69898 | 47651 06268 4 9951 60492 |
| F | 35305 32985 98743 07686 19265-99874 | 01324 98761 61870 96131 |
| G | 28753 21906 98984 76502 68499-85097 | 68762 66189 62345 10962 |
| H | 30298 47651 36068 49791 35579-86625 | 13306 58781 3 2453 58563 |
| I | 36628 24679 03507 98662 51364-85394 | 62807 35065 1 6423 54736 |
| J | 94305 32985 98743 80686 19265-99874 | 01324 98761 61870 96174 |
| K | 89198 21980 98984 70512 68499-51692 | 02513 64698 98476 54929 |
| L | 77098 47651 36068 49791 35579-86625 | 13310 58781 32453 58055 |
| M | 62048 24609 13557 90662 51364-69898 | 07651 36268 4 9951 6 9226 |
| N | 38365 32085 98743 87686 19265-99874 | 61324 98761 61874 96783 |
| O | 42108 21986 98984 76510 68499-51692 | 62513 60698 98406 54921 |
| P | 69898 47651 36268 49791 35509-99874 | 60324 98761 61874 96185 |
| Q | 48628 24679 13557 98662 51064-69898 | 40651 06268 49951 60399 |
| R | 38065 32985 98743 87680 09265-99874 | 01324 98761 61870 96158 |
| S | 69898 47651 30268 49951 69226-51692 | 02513 64698 90476 54953 |
| T | 94798 07651 36268 49701 35579-86625 | 13306 58781 32453 58631 |

SYSTEM FOR CREATING HIGH AND LOW SPEED NON-ALGORITHMIC RANDOM NUMBERS FOR ENCRYPTION/DECRYPTION

This application claims priority from Provisional application Ser. No. 60/224,778, filed Aug. 14, 2000.

TECHNICAL FIELD

The invention pertains to the general field of encryption and decryption systems and more particularly to a system which utilizes random encryption and decryption numbers derived from natural non-algorithmic sources.

BACKGROUND ART

In the applicant's co-pending patent application, a method is disclosed for creating non-algorithmic random numbers and for publishing the random numbers on the Internet. This Internet publication typically consists of 1000 random numbers in some chosen period of time. The typical use of this is similar to the "one-time-pad" cipher system. The normal cipher method would be to simply choose a starting line and number whereby the usual sequential string of numbers would suffice to convert all the digitized plane-text letters to coded digits or symbols.

One simple way a unitized random number sequence may be checked for randomness is by taking the average of all 0 to 9 concerned individual numbers and checking that average against the number 4.5. The average can deviate in a Bell curve plus or minus, especially from smaller sequence groups. Allow that naturally derived numbers do not have to attain an average within some chosen sequence of number examination.

By aligning the grouped 1000 numbers (or any chosen-amount of random numbers) so that they are positioned correspondingly in vertical columns as well as horizontal lines of successive numbers to form a rectilinear relationship, a "field" of random numbers is created which enhances visual manipulation.

A number field, as taught here, allows both a planar and parallel multi-planar relationship to exist for use of the numbers. Protocols of use can include simple understood procedures to be agreed upon by two or more cipher users such as:

a. Skipping an agreed upon separation of numbers between the numbers that will be used.
b. Skipping an agreed upon separation of lines between the lines that will be used.
c. Skipping an agreed upon separation of both lines and numbers between numbers that will be used.
d. Using an agreed upon alternation of lines.
e. Using and agreed upon separation and alternation of lines.
f. Stepping between lines as consecutive numbers are used.
g. Other similar geometric position shifts to chose consecutive numbers. +X might mean count left to right, and −x means to count right to left. +Y might mean count lines upward, and −y means to count lines downward.
h. The use of geometric overlay patterns.

Using planar algorithms to determine which consecutive natural random number will be used. Such algorithms may include values of X and Y as well as −X and −Y values in addition to numerical constants.

The use of such protocol means that the first used number might be any agreed upon number of the numbers in the field For example the $1^{st}$ random number corresponding with the unit column of the day of the month. The $15^{th}$ day would direct one to scan the field numbers sequentially until the $1^{st}$ number 5 is found. The second number may be any additional number in the field and neither consecutive in position or line choice. Obviously in a field of random numbers, the selection of the numbers used in an unpredictable order (without knowing the protocol) quickly creates compounded decryption difficulties.

The creation of such Random Number Fields makes possible a simple field cipher arrangement requiring nothing more than pencil and paper when the Internet presentation of a Random Number Field exists. Conversely, this cipher method creates an astronomical burden upon all encryption methods. The invention of Random Number Fields, on published Web page presentations, creates such a simple cipher means while simultaneously compounding the difficulty of decryption methods. Encryption and decryption software may also be used. An Internet presented Random Number Field is ideal for identifying a key-set of numbers for use in more conventional ciphers.

One preferred method of generating slow-speed natural random numbers is by the variable reflection or refraction of light across a liquid cylinder sustaining a flow of rising bubbles where the upward dimension is at least 10 times the bubble stream diameter. The illuminated photo detectors are modulated by these random events and present a randomly variable voltage to an analog to digital (A/D) converter circuit component. The concept allows multiple levels of photo detectors to be positioned and modulated. Their quantity is limited only by the practical height of the liquid cylinder.

The liquid may be water and the bubbles filled with air or a less viscous fluid such as acetone or methyl acetate and an inert gas such as nitrogen or helium that may be used in a safer re-circulating gas system. The advantage to these latter cases is greater rise velocity of the bubbles and faster sample time for each optical detector level. The use of a water jet can enhance bubble velocity within a fluid. Whereas in the above illustration the object was to create random optical modulation with dispersed bubbles in a liquid, it is also possible to achieve random optical modulation by using the jet itself to produce a flowing liquid stream which can be directed upward or downward.

DISCLOSURE OF THE INVENTION

The present invention therefore includes improvements on the liquid filled cylinder random number generator disclosed in my prior referenced patent filing. In this text I use the word cylinder by way of example and do not exclude other forms or shapes of vertical columns filled with suitable fluid. The sequential use of clock-activated, light-emitting photo diodes or lasers, as light-sources to activate the photo detectors, allows discrete and sequential sample time for variable voltage measurements and an increased number-output rate. Positioning two or more photo-detectors, located in angular relationships with parallel or series connected logic gates which provide a "dimensional" sensing geometry that allows greater random flow of refraction modulation.

Multiple Random Number Field Expansion

The concept of natural Random Number Fields allows the expansion of non-algorithmic natural random numbers and Random Number Fields for high-speed sequential use. Assume that the Random Number Fields are created at 1000 numbers per fields at the maximum rate of numbers per second.

By using stepped non-carry sum (such as 10 position ring counters as one example) calculations such as:

1. A+B+C where A=a random number from field #1, and B=a random number from field #2, and C=a random number from field #3.
2. Stepped product calculations in a similar manner.
3. Combinations of step 1 and step 2 above.
4. By using other algorithms with natural random numbers.

By using one or more of the above means thousands of natural random numbers may be created.

By way of example we can select 6156 numbers from the numbers created per second. Dividing 6156 random numbers into three equal parts of 2052 number sequences each, they can be combined in a systematic stepped system. This results in a permutation of $2052^3$ that comprises 8,640,364,698 non-algorithmic natural-based random numbers. The significance of the results may be apparent by considering the seconds in 24 hours.:

In one hour a slower speed random number generator can produce sufficient numbers for a computer to provide much greater quantities of numbers. In fact, the computer could create any required numbers in less than 24-hours and store them to be accessed upon at a rate of hundreds of thousands per second. Obviously, once the numbers are committed to computer storage they can be presented at a much higher rate. The presentation time is correspondingly reduced.

The high-speed creation of natural random numbers makes possible a more inclusive encryption system. If a sequence of random numbers are grouped as three digits, they allow the assignment for encryption of up to 256 separate letters, numbers, and characters plus zero. The presentation speed must be increased for the same character presentation quantity per second.

The availability of a series of natural random numbers exceeding 100,000/second makes possible the mixing of plain voice conversation (usually 4,000 Hz and below) using Analog-to-Digital means with a series of natural random numbers. By reversing the combined digital numbers (sums, products, etc) resulting, modified digital numbers are produced which are converted back to modified analog modulation that is encrypted.

An intended receiving party uses the same set of natural random numbers in reverse algorithm (− for +, ÷ for ×, etc) by then passing the encrypted modulation through an Analog to Digital converter in order to incorporate the reverse algorithmic step and therefore go back to an analog signal, which allows a plain voice presentation.

It is an object of this invention to produce recorded natural random numbers at high-speed for recording in media which has the capability to receive the natural random numbers digitally at one rate, and being able to play them back at a higher rate. This could be facilitated electronically by increasing a controlling clock speed, or mechanically by increasing recording tape or recording disc speed during playback. Thus, "time compression" can provide a corresponding presentation rate increase.

Adding additional groups of natural random numbers also provides enough numbers from a faster computer to generate millions of random numbers per second. Such a vast 24-hour natural random number sequence may then be stored on tape, disc, or other high-capacity memory storage means for later use. Additionally, combinations of stepped sum, stepped multiplication, and re-summation algorithms can be utilized to expand the available working random number group. Preferably by also inserting additional quantities of naturally derived random numbers.

The actual computer storage of 6,000 random numbers is not significant. In common computer terms, about 86 lines with 70 columns will accomplish it in memory requirements. Therefore the memory needed for just fewer than this number of lines and columns will store the low rate required basic 6000 random numbers, or 78 lines with 78 columns, approximately, in matrix terms. In summary:

1. The concept of generating natural random numbers at an improved lower presentation rate per second and, after sufficient accumulation, using these numbers at a very high computing rate per second to generate an expanded sufficient number quantity to provide a high presentation rate of natural random numbers, including natural random number pairs.
2. The concept of providing during a 24-hour period, a continuous series of naturally derived random numbers at rates above or below 100,000 per second for use on Internet absolute encryption traffic or local high-speed encryption use including voice communications. Telephonic voice communication seldom needs to exceed 4,000 hertz. Hardware and software to accomplish these methods is contemplated and would be of commercial value.

Combining the inventive non-algorithmic/computerized concepts of the pending patent provides a complete computerized encryption means. Such a device would include at least one non-algorithmic natural high and a least one low-speed natural number-generator with computer components having visual read-out, and an input from software all in one package. The computer can periodically select non-algorithmic natural random numbers from the natural random number-generator(s) to insert into the algorithmic expansion program that converts the more slowly derived non-algorithmic natural random numbers to the high-speed series of numbers. Therefore a continuous new source of both high-speed and non-algorithmic low-speed natural random numbers will be generated for both encryption uses.

A search of the prior art did not disclose any patents that read directly on the claims of the instant invention. However, the following references are considered related:

Codes & Ciphers by F. B. Wrixon, pages 150–151

The Code Book by Simon Singh, pages 120 through 122

The Code-Breakers by David Kahn, pages 199 to 201

Code-Breaking without Computers—Invention & Technology, Summer 2000—Vol. 16, No. 1, page 36 to 41

["one-time pad"] request with quote marks via any Internet search engine

BEST MODE FOR CARRYING OUT THE INVENTION

Figure 1:
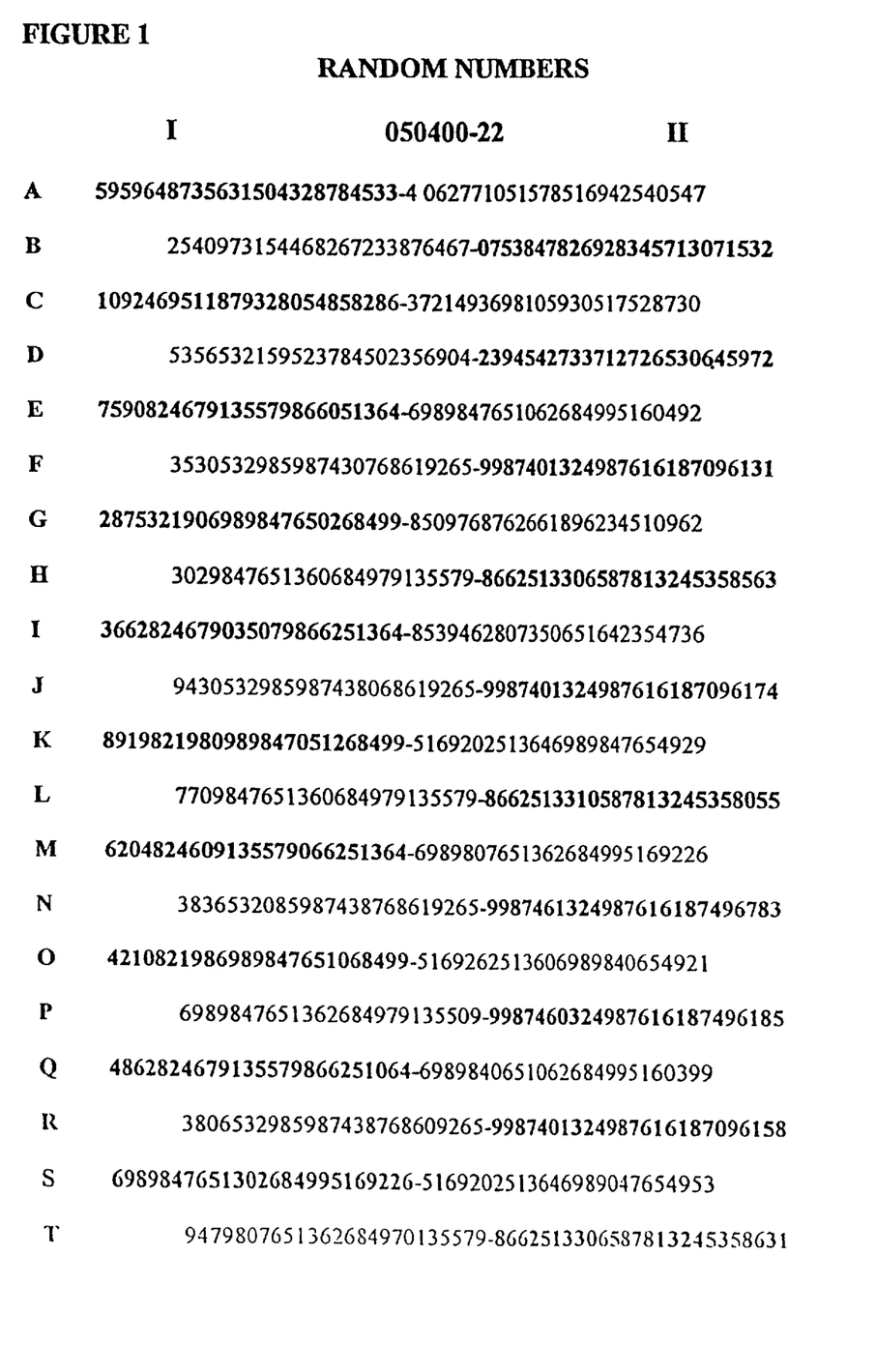
FIG. 1 depicts a typical planar Random Number Field.

The best mode for carrying out the invention is presented in terms of a preferred embodiment for a system which produces a set of non-algorithmic random digital numbers:

As shown in FIG. 1, 1,000 naturally-derived random numbers are presented in groups of 50 per line and divided into two left and right groups I & II. Letters from A to T inclusive identifies the 20 lines, for the purpose of mutual user agreement as to which numbers are to be used and the beginning number of a cipher. As explained infra, the numbers constitute a Random Number Field and may be used in various combinations including geometric means.

Figure 2:
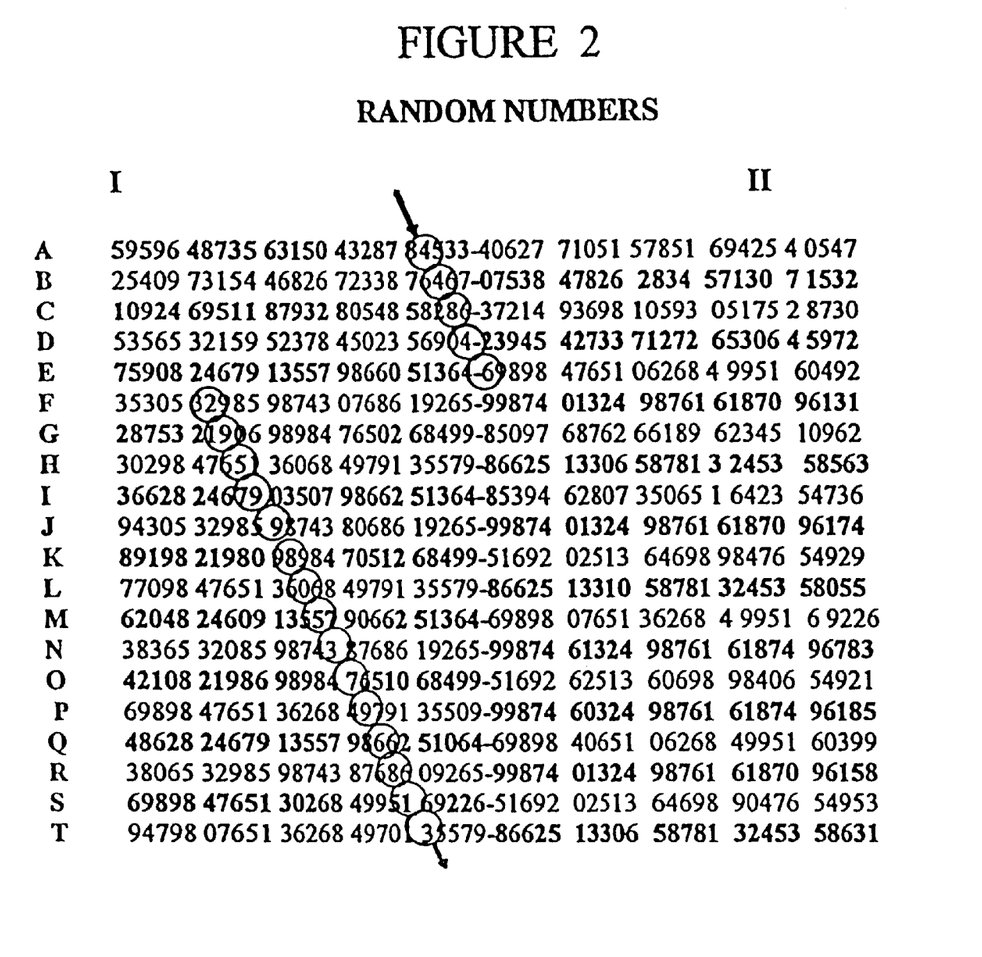
FIG. 2 depicts a typical planar Random Number Field showing a simple stepped choice of selected random numbers within the field.

FIG. 2 shows a Random Number Field of 1,000 naturally-derived random numbers presented in groups of 50 per line and divided into left and right groups, I & II (the 20 lines are identified by letters from A to T inclusive). On each line the numbers are further presented in groups of rive. An arbitrary number sequence of 20 numbers that uses the protocol of one-left and one-down is shown with circled numbers (preferably highlighted in practice), starting with the number 2 at F7. The sequence continues until it reaches the lower edge of the field. Thereupon, by agreement, the sequence is continued at the top number (4) of the next column. The total sequence designated is: 295998053796813-44846, wherein the numbers after the dash indicate the five continued top numbers.

Figure 3A:
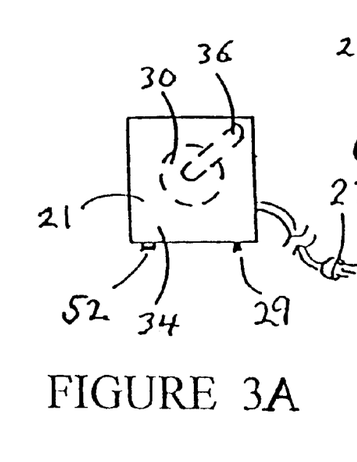
FIG. 3A is a top plan view of a self-standing natural random number generator.
Figure 3B:
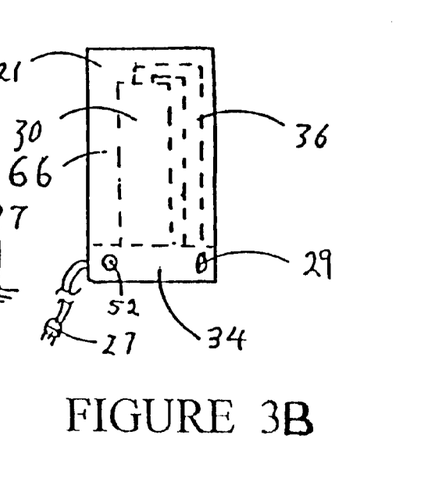
FIG. 3B is an elevational side view of the self-standing natural random number generator.

FIG. 3A shows a top and side view respectively, of a self-standing, natural random number generator 66 with housing 21 for the low-speed natural random number generator 66 showing phantom outlines of a liquid cylinder 30 type design with a gas return conduit 36 and an electric-powered gas pump 34 at the housing 21 base are also shown in FIG. 3B. A power switch 29 allows electric activation of the pump 34 via a power line connection 27. A jack provides access to natural random numbers 52 that are generated and presented as a digital output signal as also shown in FIGS. 5 and 6.

Figure 4:
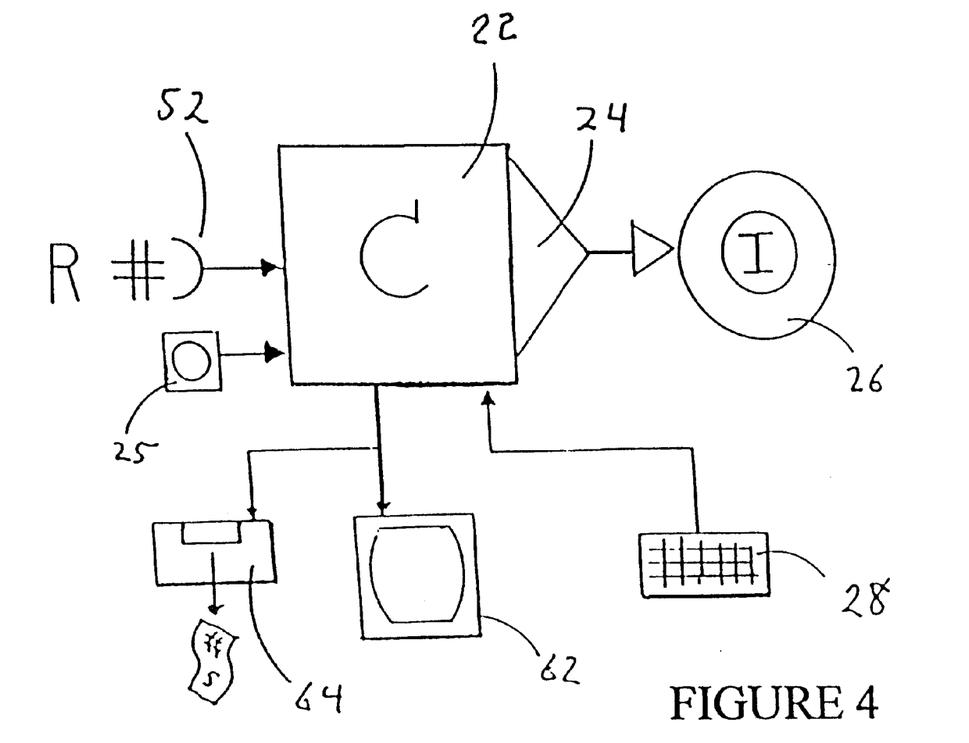
FIG. 4 is a diagrammatic sequence showing the major components for the Internet presentation of Random Number Fields.

In FIG. 4 is shown a diagrammatic sequence of major components for the Internet presentation of Random Numbers and Fields. The natural random numbers 52 are presented to a computer 22 that uses software from a drive 25 to program the presentation of the numbers on the Internet 26 via a modem 24. A monitor 62 and a keyboard 28 provide operator control of the presentation and a printer 64 provides a lasting record of each computer-selected field that appears on the Internet 26 presentation.

Figure 5:
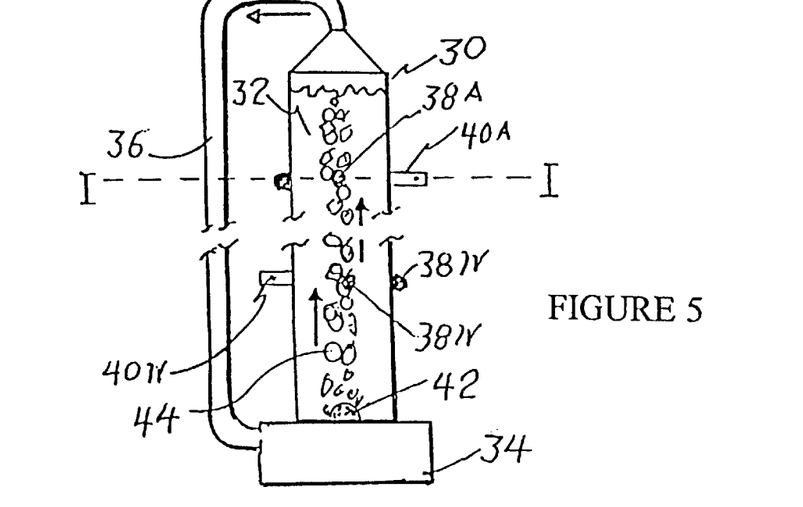
FIG. 5 is an elevational side view showing a random number generator using a cylinder of liquid with rising bubbles to create liquid refraction.

FIG. 5 shows a plan view of an improved random number generator that uses a cylinder 30 containing a liquid 32 with rising bubbles 44 to create random liquid refraction between attached photo sensors 38 and light emitting diodes 40, which results in random light intensity delivered to the diodes which can include laser types. The bubbles 44 are created by gas such as porous stone by an electric-powered pump 34. At the top of the cylinder 30, a return conduit 36 returns the gas (white headed arrow) to the pump 34 for re-circulation. The cylinder 30 is shown divided to indicate that photo detectors 38A and light emitting diodes 40A are one level of N groupings of photo-detectors 38N, and light emitting diodes 40N as the Nth group. The photo diodes 38 and light emitting diodes 40 on the reverse side of the cylinder 30 are not shown and their positions are better indicated in the sectional view I—I of FIG. 5.

Figure 6:
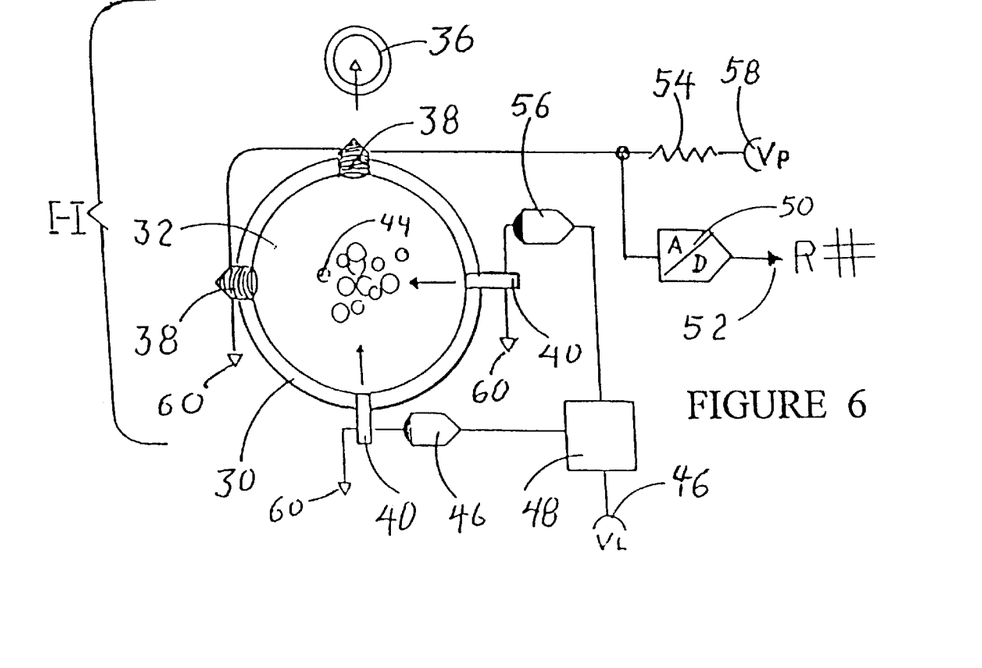
FIG. 6 is a sectional top plan view of a typical liquid column utilizing a typical photo-detector and photo-diode illuminator positions and incorporating simple electronic circuitry.

FIG. 6 is a sectional top view I—I of a liquid cylinder 30 with typical, photo-detectors 38 and a light-emitting photo-diode illuminator 40, positions and incorporating simple electronic circuitry. The figure illustrates how the photo diodes 38 are positioned at 90-degree relationships to one another and that the photo-diode illuminators 40 are positioned opposite the photo-diodes at the opposite side of the cylinder 30. The photo-detectors 38 are orientated in this manner to compound the random nature of the liquid 32 which contain bubbles 44 and are therefore connected in series to sum the compounded, modulated intensity result. Suitable voltage (Vp) 58 is provided to a resistor 54 which, in combination with the grounded series photo-detectors 32, creates a modulated voltage level that is passed on to an analog-to-digital (A/D) converter 50 and then made available as random numbers at an output 52 as shown in FIG. 6. The photo-diode illuminators 40 are energized via solid-state switches 56, and controlled by a sequence timer 48 that is energized by a suitable voltage (VL) 46. A return conduit 36 section is shown with a white-headed arrow indicating top gas flow direction.

Figure 7:
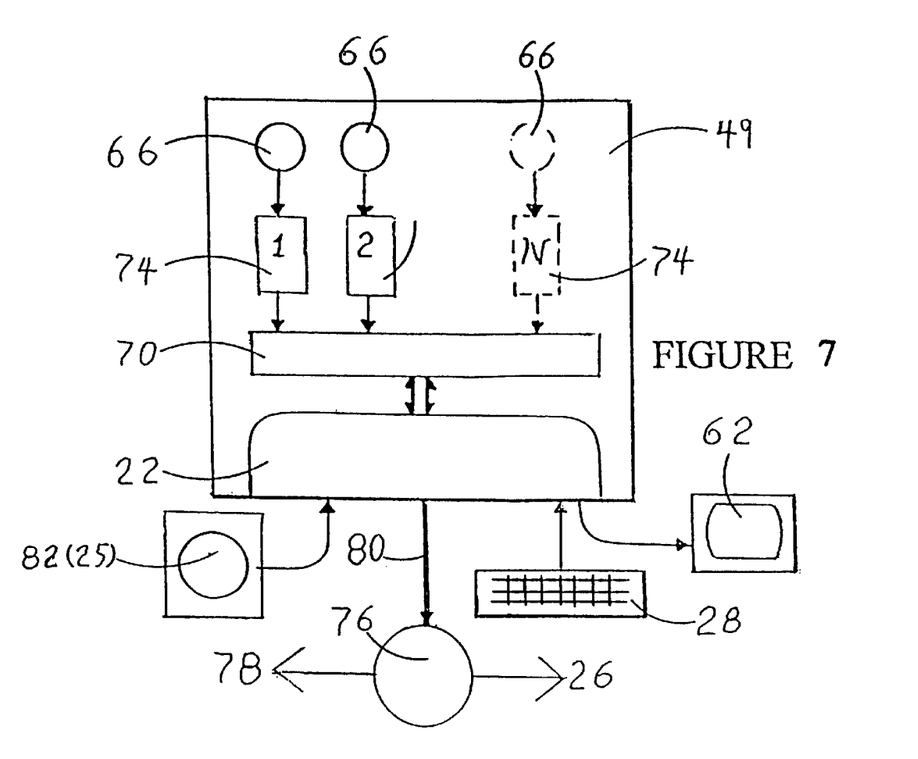
FIG. 7 shows a diagrammatic sequence of major components for the assembly of a high-speed random number generator incorporating a low-speed random number source and a computer encryption/decryption device.
Figure 9:
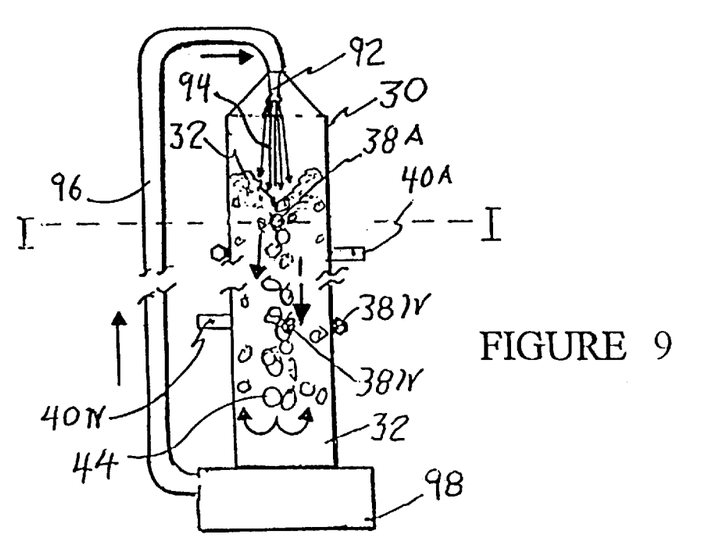
FIG. 9 is an elevational side view of a random number generator similar to FIG. 5 using a fluid jet for optical modulation.

FIG. 7 shows a diagrammatic sequence of major components for the assembly of a high-speed natural random number generator 49 incorporating a source of at least one low-speed, natural, random number generator 66. Although FIG. 9 depicts one or more separate low-speed random number generators (1, 2, - - - N) 66, the figure does not necessarily signify that the generators 66 are mounted on separate liquid cylinders 30, but may actually be at different levels of sensors and light-emitting diodes 40 on the same cylinder. The high-speed, natural, random number generator 49 further consists of serial random number accumulators 74 that present their individual output to a random number sequence processor 70. The sequence processor 70 controls the photo-diode analog sampling by a sequence of light-emitting diodes 40 energizing (connections not shown), and also presents an accumulated sequence of random numbers to a controlling computer 22 that operates at least 500 MHz.

The computer 22 is connected to a monitor 62 and controlled by a keyboard 28 and an encryption/decryption 82 software input drive 25. The computer 22 output of high-speed, natural, random numbers 80 is also presented to an external storage 76 means and to the Internet 26, or for local encryption use 78 including voice communications.

Figure 8:
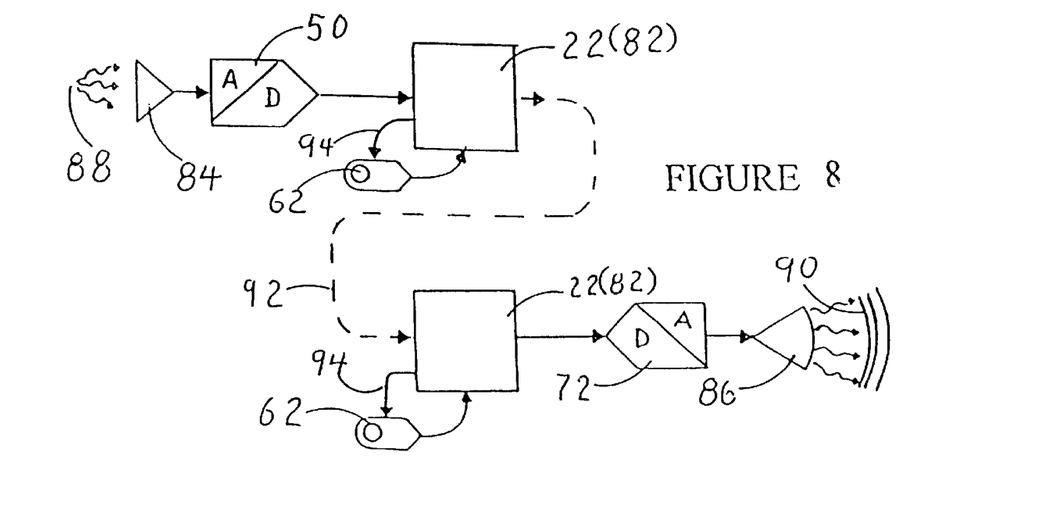
FIG. 8 shows a diagrammatic sequence of major components for the assembly of a natural random number based high-speed voice communications encryption and decryption device.

FIG. 8 shows a diagrammatic sequence of major components for the assembly of a natural, random-number-based, high-speed voice communications encryption and decryption device. Voice modulation 88 is shown activating a microphone 84 that is connected to a suitable analog-to-digital (A/D) converter 50 that transmits a digital signal to the computer 22 which has high-speed encryption 82 capabilities that uses natural random numbers supplied by a synchronized software 94 comprising a high-speed natural random number sequence 62. The computer 22 then supplies a digitally-encrypted signal 92 to be transmitted by suitable means to a second computer 22 having high-speed decryption 82 capability that refers to the same set of synchronized software 94 comprising the high-speed natural random number sequence 62. The output of the second computer 22 refers the decrypted digital signal 92 to a digital-to-analog (D/A) converter 72 that passes an analog signal to a speaker 86 that emits the original voice modulation 90 unencrypted.

FIG. 9 shows a plan view of another type of improved random number generator having a higher speed output beyond 500 numbers per second and that again uses a cylinder 30 of liquid 32 with a down-flowing fluid jet 94 that is issued from a jet nozzle 92 supplied by a pipe 96 connected to a fluid pump 98. The falling fluid, such as water, traps and drives bubbles and fluid flow downward creating optical random liquid obstruction, reflection, and refraction between photo sensors 38 and light emitting diodes 40. All other components duplicate FIG. 8.

Figure 10:
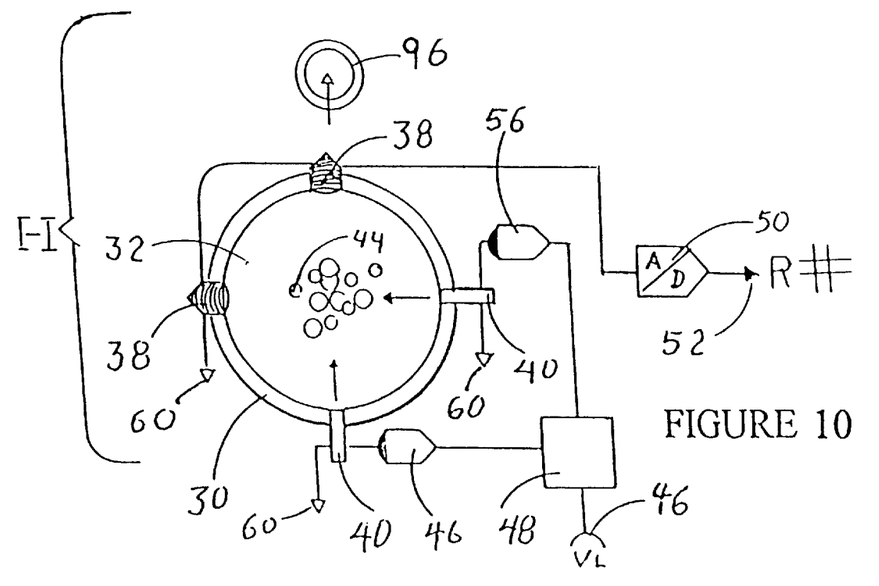
FIG. 10 is a top plan view showing the components of FIG. 5 and 6 while generating the random numbers using a fluid jet for optical modulation

FIG. 10 refers to FIG. 9 and also duplicates the components of FIG. 6 except for the fluid jet 94 and the supplying pipe 96.

Figure 11:
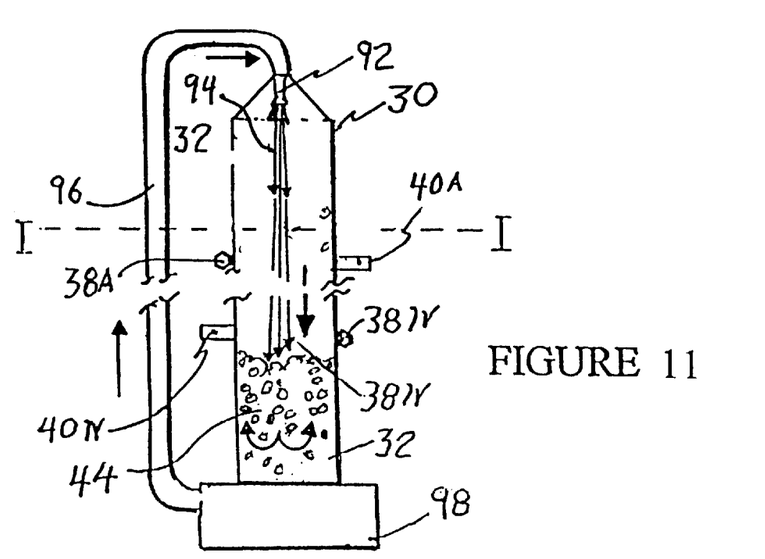
FIG. 11 is an elevational side view of a random number generator similar to FIGS. 3, 5, and 9 but using a fluid jet directly for optical modulation.

FIG. 11 shows a plan view of another type of improved random number generator having a higher speed output beyond 500 numbers per second and that again uses a cylinder 30 of liquid 32 with a down-flowing fluid jet 94 that is issued from a jet nozzle 92 supplied by pipe 96 connected to a fluid pump 98. The jetted fluid 94, such as water, flows downward creating an optical random liquid obstruction, reflection, and/or refraction between the photo sensors 38 and the light emitting diodes 40. All other components duplicate FIG. 5. The fluid jet could also flow upward and fall back downward (not shown) again modulating illumination to suitably placed photo diodes 40.

Figure 12:
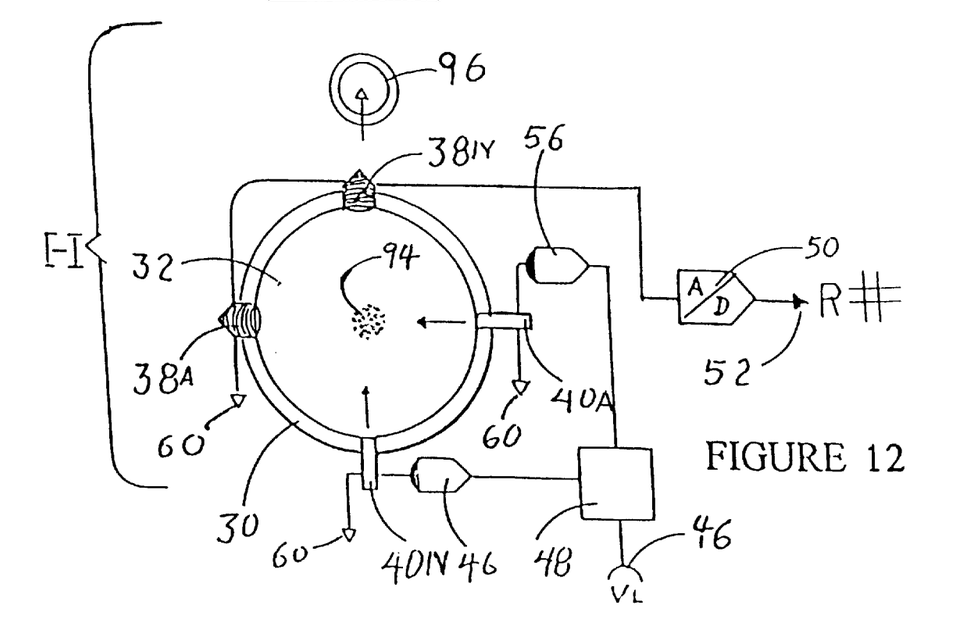
FIG. 12 is a top plan view showing the components of FIG. 9 and 14 while generating the random numbers using a fluid jet directly for optical modulation.

FIG. 12 refers to FIG. 11 and also duplicates the components of FIG. 6 except for the fluid jet 94 and the supplying fluid pipe 96.

Although the present invention has been described with a certain degree of particularity, it is understood that the present disclosure has been made by way of example, and changes in detail or structure may be made without departing from the spirit of the invention in the previous descriptions or as defined in the appended claims.

What is claimed is:

1. A system for creating a set of non-algorithmic random digital numbers comprising:
    a.) means for utilizing a natural, random physical phenomena as a source for creating said set of random digital numbers, and
    b.) means for retrieving said set of random digital numbers for use in cipher encryption and decryption.

2. The system as specified in claim 1 wherein said set of random digital numbers are in sequence, with every Nth number selected for visualization and printing as a number field.

3. The system as specified in claim 1 wherein said physical phenomena is derived from optical changes of light that are sent to a sensor, wherein the optical changes are caused by an obstructive, a reflective, and/or a refractive index of a fluid that is agitated by random means and is received by a photoelectric device.

4. The system as specified in claim 3 wherein the change of the refractive index results from bubbles rising in a fluid tank.

5. The system as specified in claim 3 further comprising a fluid pump that pumps fluid into the fluid tank.

6. The system as specified in claim 3 further comprising a fluid pump that pumps fluid and air into the fluid tank.

7. The system as specified in claim 3 further comprising a means for converting random photoelectric device electric signals to digital numbers and having means to store said digital random numbers.

8. The system as specified in claim 3 wherein the change of the refractive index results from fluid jet agitation of the fluid in the fluid tank, thus activating said photoelectric devices accordingly.

9. The system as specified in claim 6 wherein said means for storing and retrieving said set of digital random numbers comprises a computer.

10. The system as specified in claim 9 wherein said digital random numbers are sequentially stored in said computer before being released to a secured Internet site from where the numbers may be accessed.

11. A system for creating a set of non-algorithmic random digital numbers wherein fluid agitation is created and optically measured as an electrical signal, and thus presented to an analog/digital converter to create digital random numbers for encryption use.

12. The system as specified in claim 11 wherein the digital random numbers are subsequently stored in a computer memory for local and Internet use in encryption and other random number uses.

* * * * *